United States Patent Office 3,317,299
Patented May 2, 1967

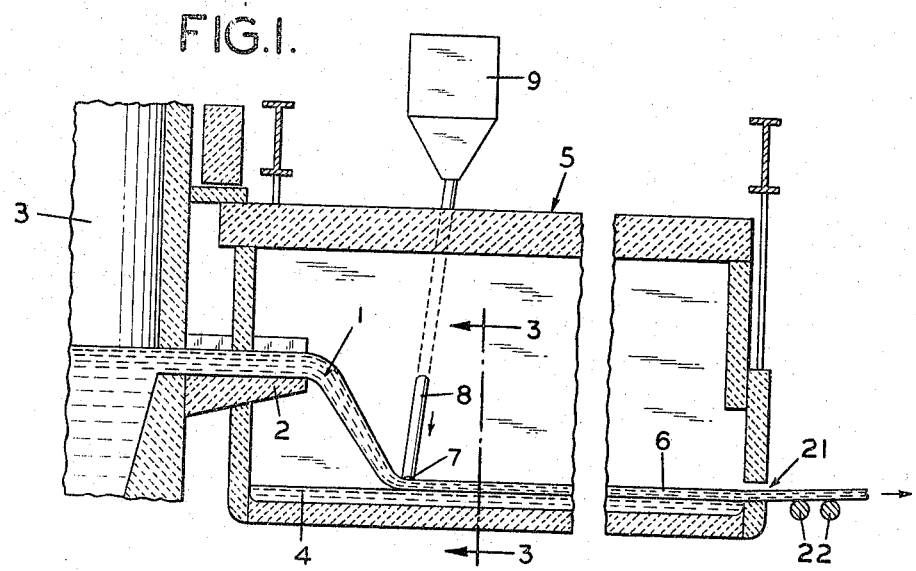
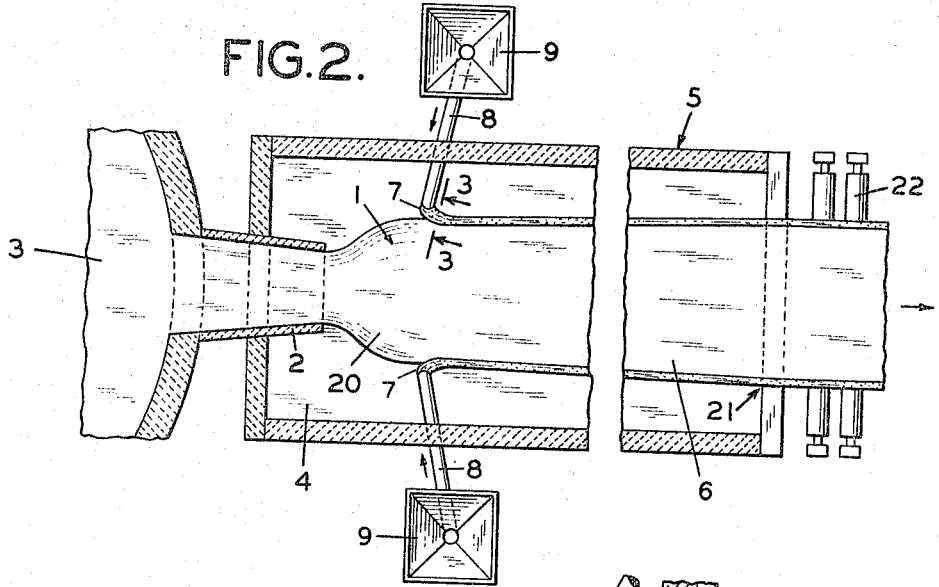
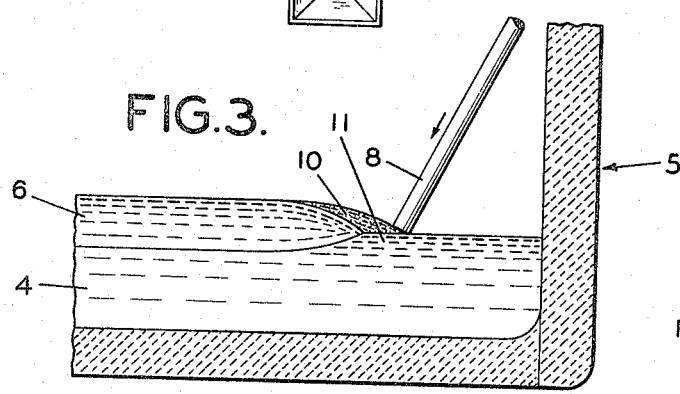

3,317,299
METHOD OF CHANGING THE EQUILIBRIUM THICKNESS OF A GLASS SHEET BEING FORMED ON A MOLTEN METAL BATH
Michel Bré, Paris, France, assignor to Compagnie de St. Gobain, Neuilly-sur-Seine, Seine, France
Filed July 31, 1963, Ser. No. 299,058
Claims priority, application France, Aug. 3, 1962, 906,016; July 16, 1963, 941,658
6 Claims. (Cl. 65—60)

This invention relates to the manufacture of flat glass. It may also be applied, in some of its aspects, to other forms of glass but it is particularly valuable in its application to the manufacture of sheet glass by the known process, in which molten glass is deposited as a sheet on a bath of molten metal having a density higher than glass, usually tin, whereon it is fire polished and hardened to a state capable of withstanding handling by ordinary means. The particular description does not constitute a limitation.

This process prepares a sheet of glass of any selected composition by melting in the ordinary way at the temperatures appropriate to the particular composition; the operations undertaken in the manufacture of window glass or plate glass are representative and are well known. This glass is also called silica-soda-lime glass and its method of manufacture is described in numerous publications, for instance "The Handbook of Glass Manufacture" by Tooley, Ogden, 1953. This glass after having been brought to working temperature may be deposited as a sheet onto the surface of a molten metal bath in a tank. Several metals have been used as the bath but tin is usually employed. The temperature of the bath at the place where it receives the glass, and the temperature of the enclosure above the bath are such that the surface tension of the glass and the force of gravity allow the glass to extend itself until a balance is reached and the glass stabilizes itself at a thickness of about 6.5 mm. For glasses of different composition that stable thickness may be different. The temperature of the bath and the atmosphere, in this location, is also sufficient to impart a fire polish to the surface of the glass and to level any minute imperfections of the surface which may have been imparted by the rollers. The temperature of the bath beyond this area is progressively reduced until, as it leaves the bath, the sheet will no longer be marred by ordinary handling means such as rollers. Recently issued patents sufficiently describe such a process. In such processes there are a number of imperfections. One of these relates to the fact that the sheet of glass tends to establish itself, by spreading out on the surface of the metal, until it obtains a stable thickness of about 6.5 mm. It is frequently desirable to make glass of other thickness and this limitation constitutes a substantial inconvenience. The mechanical processes, such as a traction exerted on the glass sheet, associated or not with a regulation of the successive temperatures of the glass sheet thus drawn, which have been proposed to obtain variations of its thickness have the inconvenience of producing more or less accentuated deformations of the sheet. The metals which are used for the bath tend to oxidize at the temperatures employed; the oxides tend to float on the surface of the metal, tend to be entrained by the sheet of glass, and cause imperfections in the surface of the glass when thus entrained. In order to prevent this situation from arising the machines have been constructed to complex designs which enable the operator to maintain a nonoxidizing gas throughout the surface of the metal. Complexity of design and the continuous use of nonoxidizing gasses are both undesirable and costly.

It is an object of this invention to control the oxidation of metallic receiving baths which carry glass sheets. Another object of the invention is to eliminate the use of nonoxidizing atmospheres in the practice of making glass forms on molten metal. Another object is to simplify the apparatus used in glass flotation.

A particular object of the invention is to obtain variations in the stable thickness assumed by the glass on the liquid support. Another object is to act upon the glass at the temperature of formation of the sheet, whereby to establish other thicknesses than those which have heretofore been considered standard for such glass.

A further object is to control oxidation of the bath and the thickness of the sheet simultaneously.

Another object of the invention is to extend the sheet of glass without imposing traction upon it.

The objects of the invention pertaining to the control of the thickness of the sheet are accomplished, generally speaking, by applying to the hot glass sheet a surface tension active agent, which is molten at the temperature of the glass and unreactive with the glass and the bath.

The objects of the invention concerning the inhibition of oxidation are accomplished, generally speaking, by coating the exposed surface of the bath with a stable liquid which wets the glass, which is less dense than the bath, and is substantially immiscible in it. The same compounds which serve to control the surface tension of the glass sheet may be useful for preventing the oxidation of the bath.

The process of the invention involves coating at least the border of the glass sheet during its formation with a liquid which wets the glass and has surface tension different from that of the glass, either higher or lower, and which is not reactive with the liquid support and not miscible with it, thus constituting a strip on the edges of the glass and in contact with the liquid, and which has surface tension different from that of the glass itself. This produces a sheet of definite thickness which is a function of the surface tension of the liquid which constitutes the edge coating. The thickness of the stabilized sheet will be either greater or less than that of a normal stabilized sheet (6.5 mm. on a tin bath), depending upon the surface tension of the glass in contact with the coating liquid.

Certain metallic oxides lower the surface tension of the glass substantially and permit it to expand more than normal, thus producing a thinner sheet. Among these compounds $B_2O_3$, alone or combined with oxides of Pb, K, V, is generally useful.

Examples of metallic compounds which may be used are—

Lead borate: Percent by weight
$B_2O_3$ ------------------------------------- 88
PbO --------------------------------------- 12

Vanadium borate:
$B_2O_3$ ------------------------------------- 90
$V_2O_5$ ------------------------------------- 10

Silicoborate of lead:
$SiO_2$ -------------------------------------- 3
$B_2O_3$ ------------------------------------- 12
PbO --------------------------------------- 85

Alcalinosilicoborate:
$SiO_2$ -------------------------------------- 34
$B_2O_3$ ------------------------------------- 35
$Al_2O_3$ ------------------------------------ 2
CaO --------------------------------------- 8
$Na_2O$ ------------------------------------- 16
MgO --------------------------------------- 5

Potassium borate:
$B_2O_3$ ------------------------------------- 60
$K_2O$ -------------------------------------- 40

Examples of the agents of higher surface tension than the glass are—

Silico aluminate of MgO: Percent by weight
- SiO$_2$ ----- 50
- Al$_2$O$_3$ ----- 25
- MgO ----- 25

Another silico aluminate of MgO:
- SiO$_2$ ----- 40
- Al$_2$O$_3$ ----- 25
- Na$_2$O ----- 15
- CaO ----- 20

A third silico aluminate of MgO:
- SiO$_2$ ----- 40
- Al$_2$O$_3$ ----- 25
- Na$_2$O ----- 15
- ZnO ----- 20

These compounds act to increase the stable thickness of glass by about one or two-tenths of a mm.

The following is a specific example of the invention:

The following batch ingredients were melted in a standard furnace which had fining temperature of 1450° C. and working temperature of 1050° C.:

- Sand ----- 61
- Dolomite ----- 11.5
- Soda carbonate ----- 19.5
- Lime stone ----- 6.5
- Sodium sulfate ----- 1.5 producing a typical glass of the following composition:

Percent by weight
- SiO$_2$ ----- 72
- CaO ----- 8.5
- Na$_2$O ----- 14.5
- MgO ----- 3
- Alumina, iron oxide and potassium oxide ----- 2

This glass was extruded at working temperature and passed between two rollers which fixed its thickness at 7 mm. It was deposited upon and moved across the surface of a bath of molten tin, the temperature of which was maintained at 980° C. in that region where the leveling and fire polishing took place, thereafter being reduced by gradual steps to a temperature of 610° C. where it was withdrawn from the forming apparatus onto rollers. The first portion of the glass was delivered to the take-off rolls with a thickness of 6.5 mm., its stable thickness under the operating conditions employed. After the first portion of the glass had passed, the metal two funnels delivered molten B$_2$O$_3$ to the edges of the glass and to the surface of the molten tin, as indicated in FIGS. 2 and 3 of the accompanying drawings. As this second portion of the glass was withdrawn its stable thickness was found to be 4.5 mm., a reduction in thickness of 2 mm. which was wholly due to the effect of the contacting oxide which covered the edges of the sheet and the contiguous surface of the glass. The boric oxide, or the anhydride as it is sometimes called, prevented the oxidation from occurring along the edges of the sheet and prevented oxidized particles, formed on the uncovered surface of the molten metal, from being entrained by the glass. The reduction in surface tension produced at the edge of the glass by the boric oxide was sufficient to allow the glass to extend itself with a corresponding reduction in thickness. The boric oxide was removed from the glass after the glass became protected against damage by handling, the edges of the sheet were trimmed away and the sheet was cut into lengths suitable for inspection and reduction to marketable sizes.

The invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

FIG. 1 is a diagrammatic vertical section through forming machinery;

FIG. 2 is a horizontal section through the same apparatus and

FIG. 3 is an enlarged diagrammatic transverse substantially vertical section taken in a plane identified by line 3—3, FIGURE 1, and which illustrates the relation of the bath to the glass and the surfactant at the longitudinal edges of the sheet.

In FIG. 1 the glass 1 issues from the pouring spout 2 of a furnace 3 without rolling and drops upon a bath 4 of molten tin which is confined within the enclosure 5. The glass spreads out as it is moved across the surface of the tin, as shown, at 20 in FIG. 2. At the place where the glass begins to spread two funnels 9—9 deliver through spouts 8—8 molten B$_2$O$_3$ to the edges of the glass, covering the edges as indicated at 10 in FIG. 3.

The boric anhydride forms strips 10 adhering to glass only in the zone of the edges and covering also at 11 a small portion of the supporting bath of tin, in the immediate vicinity of the edges of the glass ribbon.

Due to the relatively high viscosity of these strips of boric anyhdride compared with the viscosity of the supporting liquid, and to their adherence to glass, these strips are drawn with the moving glass ribbon. It results that the strips are maintained in place on the glass ribbon without having a tendency to spread over and under the glass ribbon.

The glass ribbon with its edges coated by a film of liquid boric anhydride, is maintained for a sufficient time at a viscosity of the order of $10^3$ to $10^5$ poises, and the thickness of the ribbon decreases until an equilibrium state is established between the edges under the action of gravity, and the surface tensions between the glass and the supporting liquid, between the supporting liquid and the boric anhydride, and between the boric anhydride and the furnace atmosphere.

The ribbon 6, having attained its final width and having been fire polished on the first part of the bath, and cooled to handling temperature as it reaches the discharge port 21, is received on rollers 22 and delivered elsewhere for further processing.

Boric anhydride can also be maintained on the whole free surface of the tin in order to protect the surface from oxidation forming over that surface a thin film which is continuous and has low surface tension. It wets the edge of the glass, acts to reduce the surface tension, and produces a certain uniform reduction in thickness.

According to the invention, the B$_2$O$_3$ may be used alone or in combination with other oxides which do not react on the liquid or the glass, notably those which lower surface tension such as potassium oxide, lead oxide and the oxides of vanadium. It is to be understood that these oxides are given by way of examples and that all the metal oxides which have the qualities specified hereinabove are useful.

Other advantages arise from the use of coating strips limited to a narrow zone along the edges of the glass ribbon, as distinguished from the coating of the whole free surface of the supporting bath. The coating film, for example 1 mm. thick, has a certain amount of cohesion which can impose a braking drag on the edges of the sheet when the whole surface between the edges of the glass ribbon and the furnace wall is covered, which is avoided by using the strips; the pellicle of boric anhydride adheres to the glass and is carried along with the glass in its movement. The glass sheet whose edges are in contact with the film of the agent acting on the surface tension is kept at a viscosity of $10^5$ to $10^3$ poises (temperatures of 900 to 1200° C.) and the whole of the sheet is thinned out until it reaches equilibrium. This equilibrium is apparently established by the product of three sets of balanced forces, the relative surface tension of the glass and the liquid support; the relative surface tension of the liquid support and the surfactant; and the relative surface tension of the surfactant and the atmosphere in the furnace. However, this is theory and the applicant is not bound by it.

In adding liquids of higher surface tension, one proceeds in the same way and may produce a thicker sheet of glass than is produced by gravity and surface tension without any addition.

These same principles are applicable to glass which has been rolled in accordance with the practice of the art before deposition on the molten metal.

The liquid bath can be of any inert material which is known to the prior art for this use, among which are tin, silver, lead and certain alloys of those metals. During the production and the thermal cycle to which the sheet is subjected during its approach to a state of rigidity, the layer of boric anhydride entrained by the edges of the sheet wets a narrow strip extending only about a centimeter or a little more or a few centimeters inward from the edges, which is not inconvenient as they are normally cut away in ordinary practice.

The following components are illustrative of the metalates which are useful: vanadium, potassium and lead borates; silicoborates of lead; silicates of lead; silicoborates of potassium.

Boric anhydride can be introduced as boric acid which at temperatures on the order of 500° C. to 1,000° C., forms a protective film which is inert to tin, forms a thin film on tin, is not volatile, wets the glass and the wall of the furnace, has low viscosity, is inert to the glass and does not impair its surface. There is little loss of metal which is thus protected. At 700° C. the loss of tin covered by a thin film of molten boric anhydride is only 8 mg./hr./cm.$^2$. At 800° C. this loss is only 10 mg. and at 900° C. to 1,000° C. it is only 12 mg. The films employed may be no thicker than a millimeter and they give satisfactory results even when they are much thinner; continuity of the film seems to be the basic requirement for the protection of the metal which is beneath the film.

Boric anhydride has another advantage in that it can dissolve tin oxides at working temperatures, and it thus maintains the tin bath at a higher level of efficiency. Boric anhydride has low surface tension, which enables it to wet and form a thin film on the substances ordinarily used in glass making such as on graphite, on refractory, and on the glass itself. The vapor tension of boric anhydride is very low at temperatures up to 1,000° C., so that there is no fear of loss of protection by that group. The viscosity of boric anhydride in the molten state is very low when compared to that of window glass. At 900° C. it is $\frac{1}{1000}$ of that of window glass and at 1,000° C. it is $\frac{1}{100}$. This great difference of viscosity prevents mutual diffusion of the boric oxide and the glass at their zones of contact, at temperatures which are between 400° and 800° C.

The invention thus forms a continuous film over the metal or that part of it which is to be protected, wets the glass, and eliminates the difficulties which have been explained hereinabove.

As many apparently widely different embodiments of the present invention may be made without departing from the spirit and scope thereof, it is to be understood that the invention is not limited to the specific embodiments.

What is claimed is:

1. The method of controlling the thickness of sheet glass produced by depositing molten glass upon a bath of molten metal to form an incipient ribbon, and continuously moving the same over and along the bath while allowing the ribbon to attain uniform thickess, comprising, depositing on and along the edges only of the ribbon and the surface of the bath contiguous thereto, a material which affects the surface tension of the glass to thereby cause a change in the equilibrium thickness from that otherwise resulting, said material being stable at the temperature to which it is subjected during the method.

2. The method of claim 1, said material being characterized by (a) density less than, immiscible with, and non-reactive with the bath; (b) adherent to the glass.

3. The method of claim 2, said material lowering the surface tension of the glass.

4. The method of claim 3, said material being selected from the group consisting of boric oxide, lead borate, vanadium borate, silicoborate of lead, alcalinosilicoborate, and potassium borate.

5. The method of claim 2, said material increasing the surface tension of the glass.

6. The method of claim 5, said material being silico aluminate of magnesium oxide.

References Cited by the Examiner
UNITED STATES PATENTS

| | | | |
|---|---|---|---|
| 2,754,559 | 8/1956 | Fromson | 65—65 |
| 3,083,551 | 4/1963 | Pilkington | 65—65 |

DONALL H. SYLVESTER, *Primary Examiner.*

G. R. MYERS, *Assistant Examiner.*